United States Patent
Leimbach et al.

[11] Patent Number: 6,112,613
[45] Date of Patent: Sep. 5, 2000

[54] ACTUATING DEVICE FOR AUTOMATIC ACTUATION OF A TRANSMISSION

[75] Inventors: Lutz Leimbach, Schweinfurt; Thomas Wirth, Schwanfeld; Thomas Göppner, Salz; Andreas Ratte, Dittelbrunn-Hambach, all of Germany

[73] Assignee: Mannesmann Sachs AG, Schweinfurt, Germany

[21] Appl. No.: 09/218,513

[22] Filed: Dec. 22, 1998

[30] Foreign Application Priority Data

Dec. 22, 1997 [DE] Germany .................. 197 56 943

[51] Int. Cl.[7] .................. F16H 61/34; F16H 59/02
[52] U.S. Cl. .................. 74/473.11; 74/335
[58] Field of Search .................. 74/335, 473.1, 74/473.11, 473.12

[56] References Cited

U.S. PATENT DOCUMENTS

| | | | |
|---|---|---|---|
| 2,547,317 | 4/1951 | Gustafson | 74/473.33 |
| 2,694,943 | 11/1954 | Brumbaugh | 74/473.1 |
| 4,938,088 | 7/1990 | Langley et al. | 74/335 |
| 5,473,959 | 12/1995 | Lasoen | 74/335 |
| 5,722,297 | 3/1998 | Tischer et al. | 74/473.21 |
| 5,875,866 | 3/1999 | Dorfschmid et al. | 180/336 |

FOREIGN PATENT DOCUMENTS

| | | |
|---|---|---|
| 0 592 170 | 10/1993 | European Pat. Off. |
| 2 124 624 | 12/1972 | Germany |
| 195 35 755 | 3/1997 | Germany |
| 2 280 004 | 1/1995 | United Kingdom |

*Primary Examiner*—Allan D. Herrmann
*Attorney, Agent, or Firm*—Cohen, Pontani, Lieberman & Pavane

[57] ABSTRACT

An actuating device for the automatic actuation of a transmission includes at least two actuating units whose driven parts can be driven in a translatory movement by which a transmission shaft of the transmission can be driven in rotary and translatory movement for gear selection and accelerator selection. The driven parts which can be driven in translatory movement cooperate with a lever element which is connected with the transmission shaft and which is mounted in an articulated manner by means of at least one joint.

9 Claims, 4 Drawing Sheets

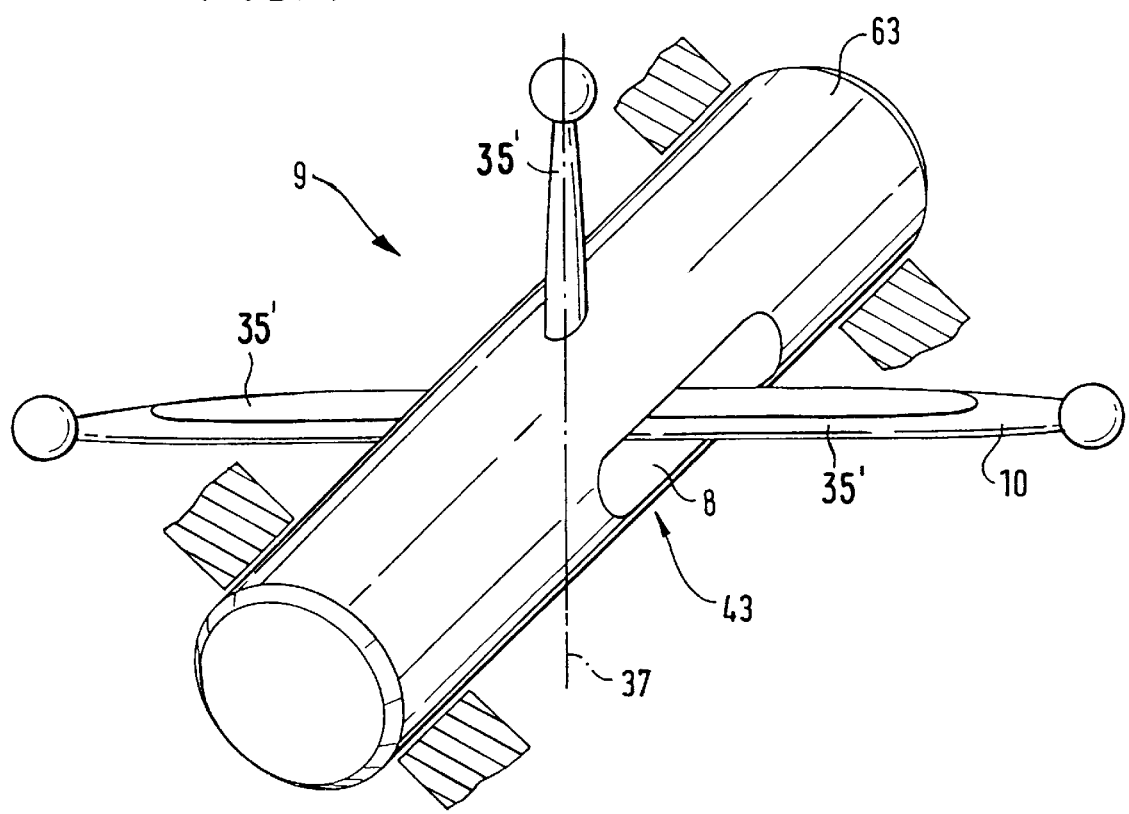

ACTUATING DEVICE FOR AUTOMATIC ACTUATION OF A TRANSMISSION

BACKGROUND OF THE INVENTION

1. Field of the Invention

The invention is directed to an actuating device for the automatic actuation of a transmission shaft in a motor vehicle transmission for gear selection and acceleration selection. The actuating device has at least two actuating units whose driven parts can be driven in a translatory movement. One of the driven parts drives the transmission shaft of the transmission in a rotary movement and another of the driven parts drives the transmission shaft in a translatory movement.

2. Description of the Related Art

Prior art actuating devices for automatic actuation of transmissions are already known, for example, from references DE 195 35 755 A1 and DE 21 24 624 OS. A problem in these prior art actuating devices is that their construction is complicated and they comprise a plurality of structural component parts. The actuating device known from DE 195 35 755 A1 is arranged in an axial extension of the transmission shaft. The installation space is very tight precisely in this region because engine transmission arrangements are becoming increasingly compact.

SUMMARY OF THE INVENTION

It is the object of the invention to provide an actuating device for actuating a transmission shaft of a motor vehicle transmission which is constructed in a simple manner and can be arranged to the side of the transmission shaft.

The object of the invention is met by a transmission with at least two actuating units whose driven parts can be driven in a translatory movement by which a transmission shaft of the transmission can be driven in a rotary and translatory movement for gear selection and acceleration selection, wherein the driven parts are connected to a lever element that is connected to the transmission shaft. The lever element is mounted in an articulated connection at a joint between the driven parts and the transmission shaft. The actuating units can be arranged to the side of the transmission shaft as a result of the step whereby the driven parts of the actuating units cooperate with a lever which is connected with the transmission shaft and by means of which a movement of the transmission shaft results from a movement introduced by the actuating units.

A first embodiment of the invention includes a lever element mounted in an articulated connection and having a free end in a working connection with the driven parts of the actuating device and another end connected with the transmission shaft. A translatory movement as well as a rotary movement can be transmitted to the transmission shaft via this lever. Since both types of movement can be transmitted to the transmission shaft by means of this lever, the required quantity of structural component parts is reduced.

In another embodiment, a lever element includes at least three arms. In this embodiment, one of the arms coincides with an axis of rotation which is predetermined by one of the actuating units and about which the lever element can be deflected by the actuating drive. The position of the arm which is arranged on the axis of rotation of the lever element is constructed so as to be symmetric with respect to this axis of rotation does not change during the rotation of the lever element about this axis of rotation.

A further embodiment includes an angle lever which is rotatably mounted. The actuating units are arranged parallel to one another to economize on space by this angle lever. The actuating units may also be arranged parallel to the transmission shaft.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 4 shows a lever element constructed as a universal joint for an actuating device according to the present invention.

DETAILED DESCRIPTION OF THE PRESENTLY PREFERRED EMBODIMENTS

Figure 1:
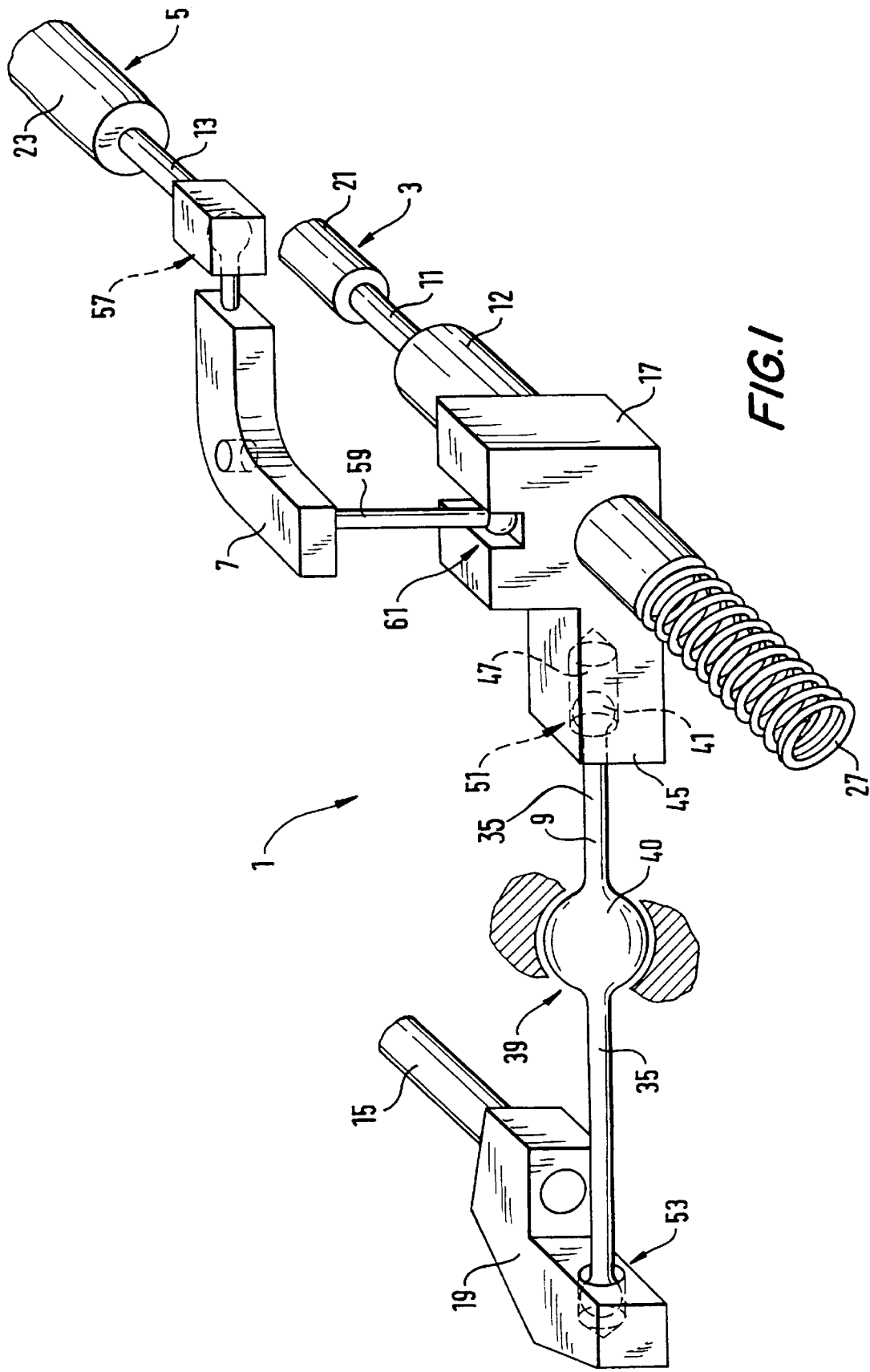
FIG. 1 is a schematic diagram of an actuating device with actuating units arranged parallel to one another according to an embodiment of the present invention.

Referring to FIG. 1, an actuating device 1 for the automatic actuation of a transmission includes a first actuating unit 3 and a second actuating unit 5. A single-acting cylinder 21 is provided as the first actuating unit 3 by which a translatory movement of the transmission shaft 15 can be introduced, the transmission shaft 15 being a gear switching shaft in the transmission. A return spring 27 is associated with the single-acting cylinder 21. This single-acting cylinder 21 is driven by a control device, not shown, for introducing a translatory movement to a driven part 11 so that when driving the single-acting cylinder 21, the driven part 11 of the cylinder 21 executes a translatory movement. The driven part 11 is connected with a shaft 12 at least so as to be axially fixed. A connection element 17 is mounted on this shaft 12. This connection element 17 has a radial projection 45 with a recess 47. A ball element 41 of a lever element 9 engages in this recess 47. This lever element 9 has a center ball 40 between its ends serving as a joint 39 to provide an articulated bearing. The lever element 9 is spherically mounted by this ball 40. The lever element 9 shown in the drawing is constructed in one piece and has two arms 35. As was already described above, a ball at the end of one of the arms is connected in an articulated manner with the recess 47 of the connection element 17 by a ball-and-socket joint 51 which is formed by the recess 47 with the associated ball element 41. The ball 40 has at least one additional arm 35 which is connected with a link element 19 in an articulated manner by a ball-and-socket joint 53, wherein the link element 19 is in turn fixedly connected with the transmission shaft 15.

The second actuating element of the actuator 1 is a double-acting cylinder 23. This double-acting cylinder 23 comprises a driven part 13 which can be driven in a translatory manner and which is connected with an angle lever 7 by means of a ball-and-socket joint 57. This angle lever 7 is rotatably mounted and comprises an axial projection 59 which engages in a longitudinal groove 61 formed in the connection element 17. The first and second actuating units 3, 5 are uncoupled from one another and both act on the lever element 9, wherein a rotational movement of the transmission shaft 15 results from driving the second actuating unit 5 and a translatory movement of the transmission shaft 15 results from an actuating movement of the first actuating unit 3. In this construction, a double-acting cylinder 23 is associated with an actuation of the transmission shaft 15 in the gear selection direction.

The operation of the actuating device 1 will be discussed briefly as follows. The single-acting cylinder 21 is driven for a translatory movement of the switching shaft 15. The driven part 11 of this cylinder 21 executes a translatory movement, wherein the shaft 12 follows this translatory movement, so that the driven part 11, the shaft 12, and the connection element 17 are driven in a translatory movement. This movement is transmitted to the lever element 9 by the connection element 17. In response to the translatory movement of connection element 17, the lever element 9 which is mounted in an articulated manner rotates about a hypothetical axis of rotation vertical to the introduced movement of connection element 17. By means of this rotating movement, the link element 19 and the transmission shaft 15 attached thereto are driven in the opposite direction to the introduced movement of connection element 17 by the lever element 9.

When the second actuating unit 5 is driven, the driven part 13 executes a translatory movement. This movement is transmitted via the ball-and-socket joint 57 to the angle lever 7. A rotational movement of the angle lever 7 results from the translatory movement, wherein the axial projection 59 follows this movement. The movement of the axial projection 59 drives the connection element 17 in rotation about an axis of rotation perpendicular to the axis of rotation of the angle lever 7. The axis of rotation of the connection element 17 coincides with the movement direction of the driven part 11 and with the center axis of the shaft 12. When the connection element 17 is mounted so as to be rotatable but fixed axially on the shaft 12, the driven part 11 can be fixedly connected with the shaft 12 or constructed in one piece with the shaft 12. However, if the connection element 17 is fixedly connected with the shaft 12 or constructed integral therewith, the driven part 11 is rotatable to ensure a decoupling of the movement which can be introduced by the first and second actuating units 3, 5 but is to be connected with the shaft 12 so as to be fixed axially.

Figure 2:
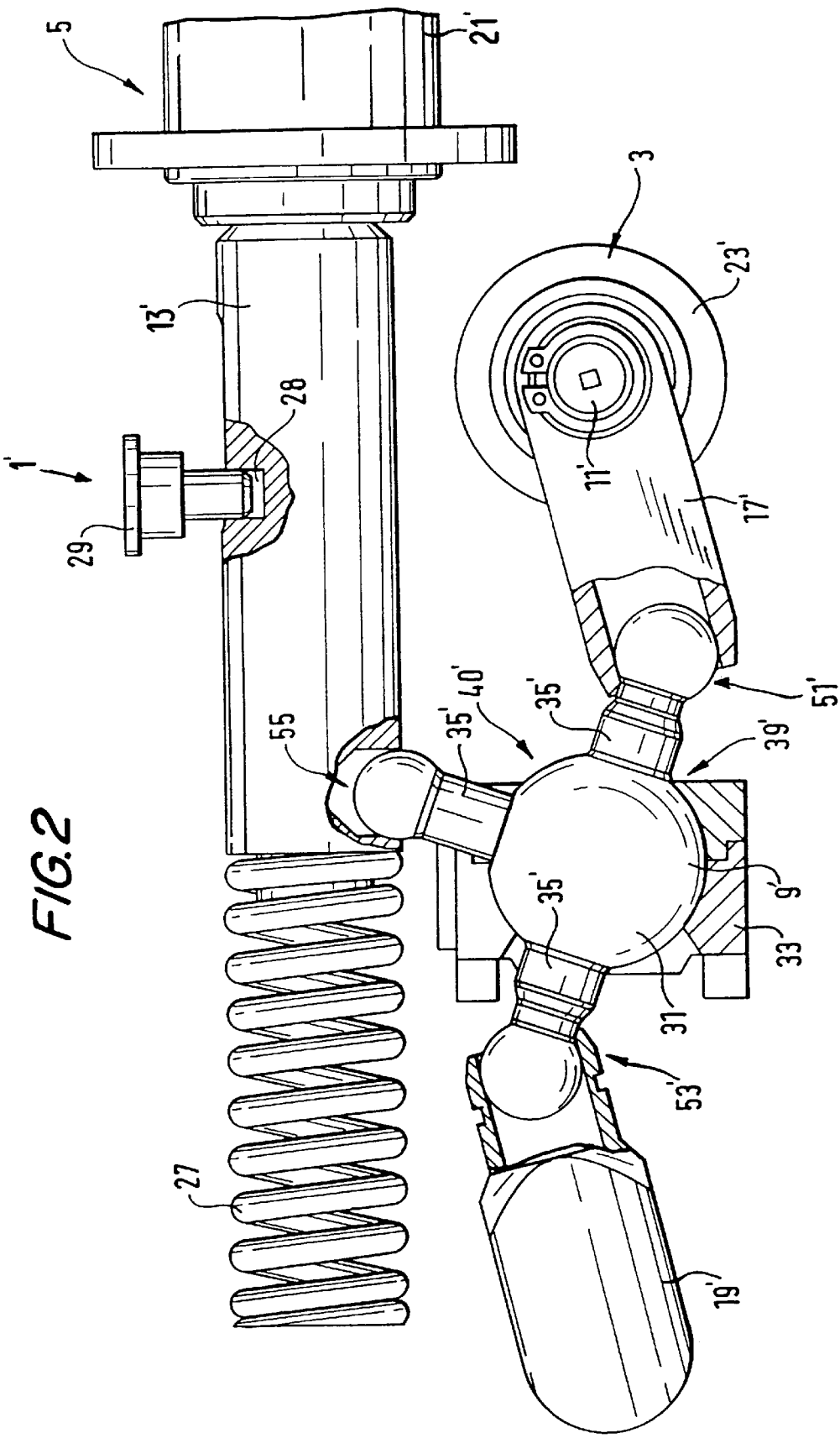
FIG. 2 shows an embodiment of an actuating device of the present invention with actuating units which are arranged at angles relative to one another.
Figure 3:
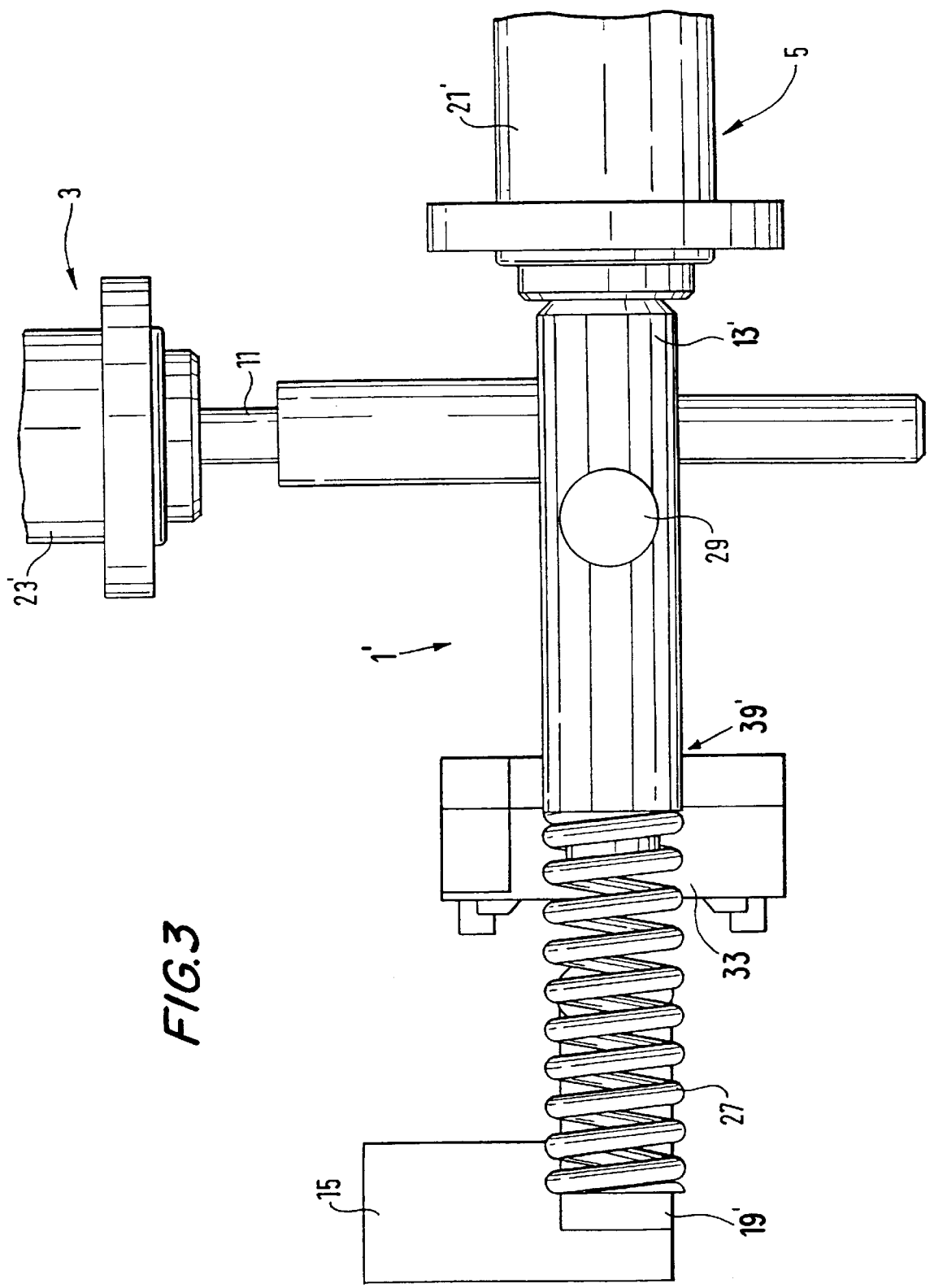
FIG. 3 shows a top view of the actuating device of FIG. 2.

FIGS. 2 and 3 show an embodiment example of an actuating device 1' in which the first and second actuating units 3, 5 are arranged at angles. In this specific embodiment, the first and second actuating units are at right angles to one another. The lever element 9' of this embodiment has three arms 35' and is drivable by the first and second actuating units 3, 5 about two axes of rotation which are arranged perpendicular to one another. The lever element 9' comprises a ball element 40' comprising ball segment surfaces 31 supported on support faces 33 which are constructed in opposite directions so as to form a joint 39'.

In this embodiment example, a double-acting cylinder 23' is provided as actuating unit 3 for introducing a translatory movement of the transmission shaft 15. The connection element 17' is connected so as to be rotatable but axially fixed with the driven part 11' of the double-acting cylinder 23'. The connection element 17' is connected with the lever element 9' via the ball-and-socket joint 51'. The lever element 9' is in turn connected in an articulated manner, via the ball-and-socket joint 53', with the link element 19' which is fixedly connected with the transmission shaft 15. The lever element 9' has another ball-and-socket joint 55 by means of which the driven part 13' of the second actuating unit 5 cooperates with the lever element 9'. This actuating unit 5 is constructed as a single-acting cylinder 21', wherein the return spring 27 is associated with the single-acting cylinder 21. The driven part 13' is provided with a guide 28, wherein a projection 29 which is fixed with respect to the housing engages in this guide 28 to predetermine a position-oriented assembly of the driven part 13'. After the driven part 13' is mounted, a recess provided in the same for forming the ball-and-socket joint 55 has a predetermined orientation. After the assembly of actuating device 1' is complete, the projection 29 is removed from the guide 28 to allow axial movement of the driver part 13'.

In this embodiment, the position of the third arm 35' which is connected with the driven part 13' via the ball-and-socket joint 55 changes when the lever element 9' is deflected for transmitting a movement from which a translatory movement of the transmission shaft results, because its center axis coincides with the axis of rotation of the lever element.

For the purpose of decoupling rotation, the lever element 9' is connected with the connection element 17' by a ball-and-socket joint 51', wherein the connection element 17' is mounted on the driven part 11' or on the associated shaft 12' so as to be rotatable and axially fixed. The operation of the actuating device 1' does not differ from that of the actuating device 1 described above with reference to FIG. 1.

Another possible embodiment form of a lever element 9" is described with reference to FIG. 4. This lever element 9" is constructed in multiple parts as a universal joint 43. This universal joint 43 comprises a center shaft 63 and a lever 10. The center shaft 63 is rotatably mounted and has an axial projection which is provided for forming the ball-and-socket joint 55. At the same axial height of the center shaft 63, a recess 8 penetrates the center shaft 63. The lever 10 penetrates the center shaft 63 through his recess 8. The lever 10 is mounted so as to be rotatable about an axis of rotation 37 which extends in axial extension of the projection of the ball-and-socket joint 55, which projection is constructed so as to be symmetric with respect to rotation with respect to this axis of rotation.

This lever element 9" has three lever arms 35' which are in a working connection with two actuating units as was already described with reference to FIGS. 2 and 3.

The invention is not limited by the embodiments described above which are presented as examples only but can be modified in various ways within the scope of protection defined by the appended patent claims.

We claim:

1. An actuating device for the automatic actuation of a transmission switching shaft of a motor vehicle transmission, comprising:

a first actuating unit mountable in the transmission and having a first driven part movable in a first translatory movement;

a second actuating unit mountable in the transmission and having a second driven part movable in a second translatory movement; and a lever element mountable at an articulative joint in the transmission, said lever element being connectable with the transmission switching shaft of the transmission and operatively connected to said first and second driven units so that a translatory movement of the transmission switching shaft is producible by said first translatory movement of said first driven unit and a rotary movement of the transmission switching shaft is producible by said second translatory movement of said second driven art.

2. The actuating device of claim 1, wherein each said first and second actuating units comprises a hydraulic cylinder.

3. The actuating device of claim 1, wherein said first translatory movement and said second translatory movement are directed at angles to one another.

4. The actuating device of claim 1, wherein said first translatory movement and said second translatory movement are directed parallel to one another.

5. The actuating device of claim 1, further comprising an angle lever mountable on said transmission for rotating about an axis, wherein said first driven part is connected to said lever element via said angle lever.

6. The actuating device of claim 1, wherein at least one end of said lever element further comprises a ball bearing support including a ball segment surface mounted on said lever element and an opposing surface connectable with one of the transmission switching shaft, said first actuating unit, and said second actuating unit, said ball segment surface being received in said opposing support surface.

7. The actuating device of claim 1, wherein said articulative joint comprises a universal joint.

8. The actuating device of claim 1, wherein said lever element comprises at least three arms respectively connectable to the transmission switching shaft, said first driven part and said second driven part.

9. The actuating device of claim 8, wherein one of said three arms comprises a center axis and one of said first and second driven parts is operatively connected to said lever element so that a translatory movement of said one of said first and second driven parts rotates said lever element about said center axis.

* * * * *